United States Patent [19]
Krikorian et al.

[11] Patent Number: 6,020,843
[45] Date of Patent: Feb. 1, 2000

[54] TECHNIQUE FOR IMPLEMENTING VERY LARGE PULSE COMPRESSION BIPHASE CODES

[75] Inventors: Kapriel V. Krikorian, Agoura; Robert A. Rosen, Agoura Hills, both of Calif.

[73] Assignee: Raytheon Company, Lexington, Mass.

[21] Appl. No.: 09/281,679

[22] Filed: Mar. 30, 1999

[51] Int. Cl.[7] ............................. G01S 13/89; G01S 7/28
[52] U.S. Cl. ..................... 342/25; 342/194; 342/195; 342/196; 342/202; 342/204
[58] Field of Search .................. 342/25, 175, 189–197, 342/202–204; 375/358

[56] References Cited

U.S. PATENT DOCUMENTS 5,708,436  1/1998  Loiz et al. ............................... 342/25

Primary Examiner—Bernarr E. Gregory
Attorney, Agent, or Firm—Leonard A. Alkov; Glenn H. Lenzen, Jr.

[57] ABSTRACT

A processing method for use in providing improved SAR imagery at high duty factors that provides for enhanced radar sensitivity. Radar signals are transmitted that embody a high duty factor ultra-high resolution SAR waveform generated using a biphase code with a predetermined high pulse compression ratio. Received radar returns comprising a SAR map are Fourier transformed and multiplied by a stored set of complex weights. The resultant Fourier transformed complex weighted SAR map is then inverse Fourier transformed to obtain compressed range bins. The inverse Fourier transformed SAR map is then processed for display.

17 Claims, 3 Drawing Sheets

6,020,843

TECHNIQUE FOR IMPLEMENTING VERY LARGE PULSE COMPRESSION BIPHASE CODES

BACKGROUND

The present invention relates generally to synthetic array radar (SAR) systems, and more particularly, to a technique that uses very large pulse compression ratio biphase codes to provide an advanced waveform used in synthetic array radar systems.

The assignee of the present invention designs and develops synthetic array radar systems. Heretofore, the application of large pulse compression ratio biphase codes for ultra high range resolution synthetic array radar resulted in poor performance due to large range sidelobes. It would be desirable to improve the range sidelobes of long biphase codes at enhanced radar sensitivities to provide for improved overall system performance. It would also be desirable to have an efficient implementation of large pulse compression ratio biphase codes for use in synthetic array radar systems.

It would therefore be desirable to have a technique that uses very large pulse compression ratio biphase codes to provide an advanced waveform used in synthetic array radar systems. It would also be desirable to have a processing method for use with synthetic array radar systems that provides improved performance at high duty factors to provide for enhanced radar sensitivity.

SUMMARY OF THE INVENTION

The present invention comprises a processing method for use in providing improved SAR imagery at high duty factors that provides for enhanced radar sensitivity. Radar signals are transmitted that comprise a high duty factor ultra-high resolution SAR waveform generated using a biphase code with a predetermined high pulse compression ratio. Received radar returns comprising a SAR map are Fourier transformed and multiplied by a stored set of complex weights. The stored complex weights are calculated off-line by taking the reciprocal of the Fourier transform of the biphase code and multiplying it by a modified set of Dolph-Chebyshev weights. The resultant radar signal (the Fourier transformed complex weighted SAR map) is then inverse Fourier transformed to obtain compressed range bins that correspond to a SAR map having enhanced sensitivity. The inverse Fourier transformed SAR map is then processed for display.

The processing method allows implementation and processing of very large pulse compression ratio biphase codes for ultra high resolution synthetic array radar systems. The processing method achieves excellent performance at high duty factors for enhanced radar sensitivity. The processing method greatly improves the range sidelobes of long biphase codes at enhanced radar sensitivities and overall system performance. In addition, the processing method provides for an efficient implementation of large pulse compression ratio biphase codes. The processing method achieves low peak range sidelobes and excellent integrated sidelobe ratio (ISLR) at a low weighting loss.

The present invention may be used in synthetic array radar systems used for reconnaissance, for example. The present invention provides a high duty factor ultra high resolution biphase coded waveform for use with the synthetic array radar systems that produces improved sensitivity and image quality.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

The present invention provides for a technique for processing large pulse compression ratio biphase codes for ultra high resolution synthetic array radar (SAR) applications. A performance analysis was conducted for compound Barker codes of up to 135:1 (371293:1) pulse compression ratios. Good performance (low sidelobes and low loss) was achieved using frequency domain processing.

In accordance with the present invention, a Fourier transform of received radar returns comprising a high duty factor ultra-high resolution SAR waveform generated using a biphase code with a predetermined high pulse compression ratio is multiplied by a stored set of complex weights. The stored complex weights are calculated off-line by taking the reciprocal of the Fourier transform of the biphase code and multiplying by a modified set of Dolph-Chebyshev weights. The resultant weighted radar signal is then inverse Fourier transformed to obtain compressed range bins.

For an actual high resolution SAR mode, polar formatting is performed on the weighted transformed radar signal before the inverse Fourier transform. For the 371293:1 compound Barker code, a weight set can be found that is twice the size of the pulse and achieves a −29 dB peak range sidelobe level, a weighting loss of 1.7 dB and an integrated range sidelobe ratio of −19 dB. These sidelobes apply to targets of the same Doppler frequency.

For targets at different Doppler frequencies, the range sidelobes degrade but additional rejection is achieved by pulse to pulse processing that overcomes this problem. The degradation of range sidelobes was found to be negligible for any Doppler offset small enough to prevent pulse to pulse rejection. Only high speed moving ground objects with Doppler frequencies that are ambiguous relative to the PRF have higher range sidelobes that are not rejected by the pulse to pulse processing. For the example presented below, the entire SAR processing (with a 371293:1 pulse compression ratio) requires a throughput of about 3 GCOPS.

Figure 1:
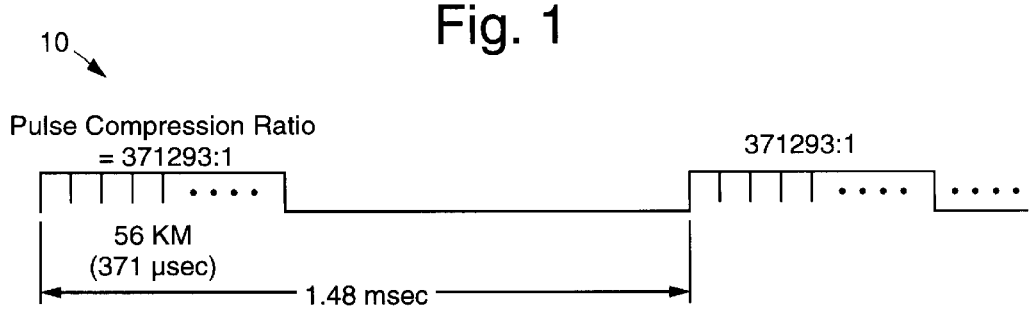
FIG. 1 illustrates an exemplary SAR waveform with a high pulse compression ratio in accordance with the principles of the present invention.

Referring to the drawing figures, an example of a high duty factor ultra-high resolution (0.5 ft) SAR waveform 10 in accordance with the principles of the present invention employing a large pulse compression ratio is shown in FIG. 1. The waveform 10 has a 25% duty factor and provides SAR imagery to about 100 km at a PRF of 680 Hz.

Figure 2:
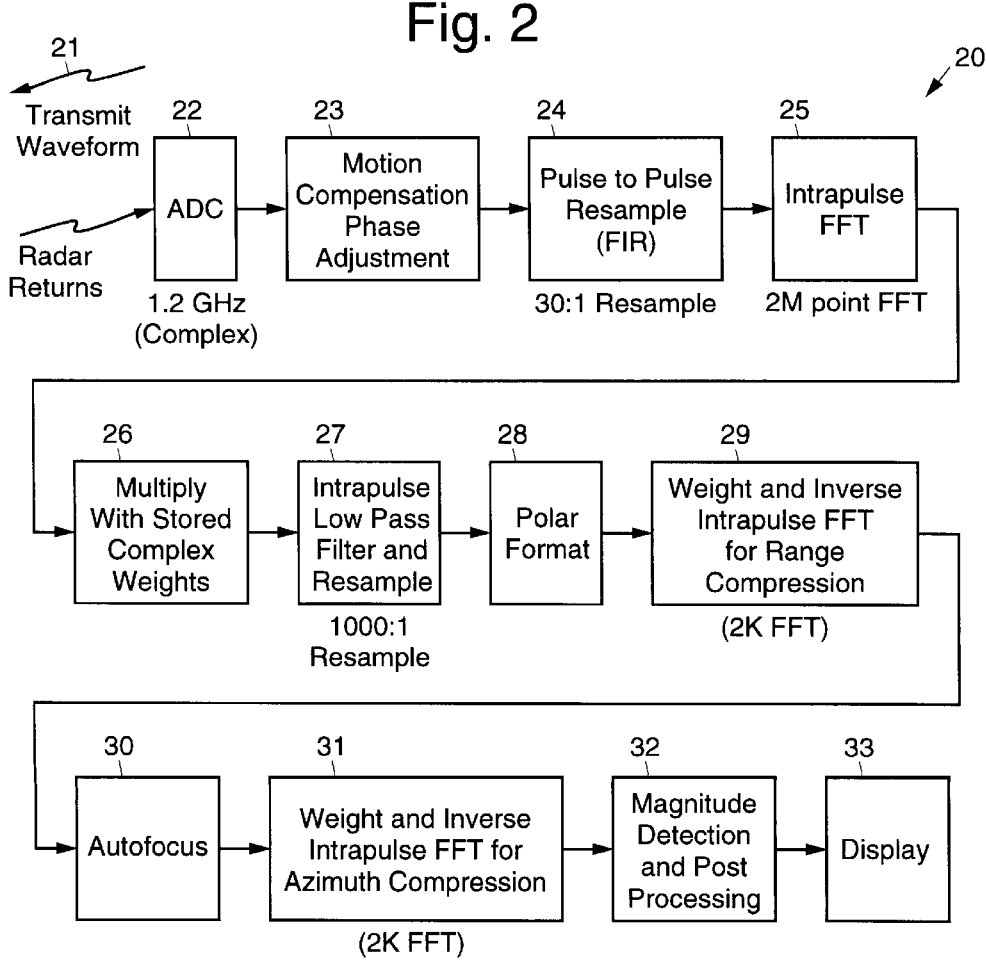
FIG. 2 is a processing block diagram for ultra fine resolution synthetic array radar system having a large biphase pulse compression ratio (371293:1 compound Barker code)

A detailed block diagram illustrating an exemplary processing method 20 in accordance with the principles of the present invention for processing the waveform 10 is shown in FIG. 2. Radar signals are transmitted 21 that comprise a high duty factor ultra-high resolution SAR waveform 10 generated using a biphase code with a predetermined high pulse compression ratio. Radar returns comprising a SAR map are digitized 22 by an analog to digital converter (ADC),which is performed at a 1.2 GHz rate. Motion compensation phase adjustment 22 may be performed on the digitized radar returns. The purpose of the motion compensation phase adjustment 23 is to cancel the change in phase due to the change in range of the radar antenna relative to the center of the SAR map.

For a SAR map of 1000 pixels by 1000 pixels at a 100 km range and an ownship speed of 200 m/sec, the motion compensated SAR map is resampled 24, by means of a finite impulse response filter (FIR), for example, using a pulse to pulse resampling ratio of about 30:1. An intrapulse FFT 25 of the radar returns is then taken and the results are multiplied 26 with stored weights of a weighted inverse of the spectrum of the biphase code. The weights are optimized for range sidelobe performance, resolution and weighting loss. This produces n equalized spectrum of the scene. The weights are a modified set of 100 k 60 dB Dolph-Chebyshev weights with 16 to 1 linear interpolation to 1600 k weights. The interpolation reduces the far pulse compression sidelobes and thus improves the integrated sidelobe ratio (ISLR).

Intrapulse low pass filtering 27 is then performed on the Fourier transformed and complex weighted SAR map to reduce the number of range bins to a desired number. The filtered SAR map is converted 28 to polar format. Range compression 29 is achieved by range weighting and inverse Fourier transforming (FFT) the SAR map. Optional autofocus processing 30 is performed the array time is 60 seconds for the exemplary processing scenario. Azimuth compression 31 is achieved by performing a weighted pulse to pulse FFT on the SAR map. Magnitude detection and post processing 32 of the azimuth and range compressed SAR map is then done to format the data for display 33. The resampling 25 (pulse to pulse resample FIR), the intrapulse low pass filter 27, and the intrapulse FFTs used in the range and azimuth compression 29, 31 account for about 95% of the total processing which is about 3 GCOPS.

Figure 3:
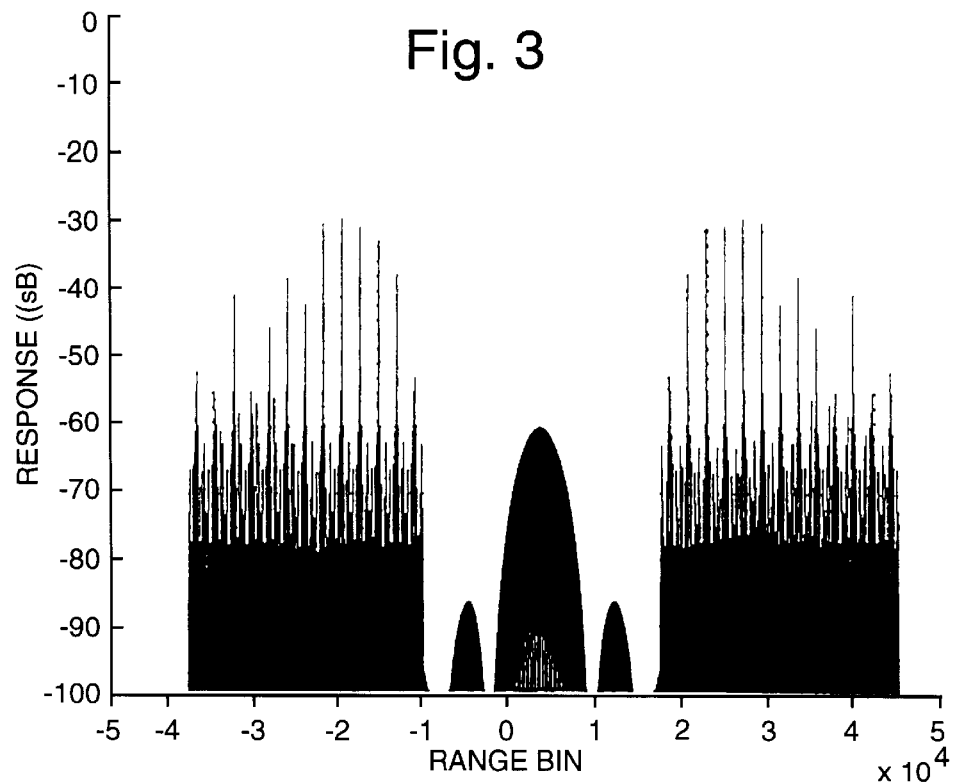
FIG. 3 is a graph that illustrates the impulse response of a 28561:1 compound Barker code.
Figure 4:
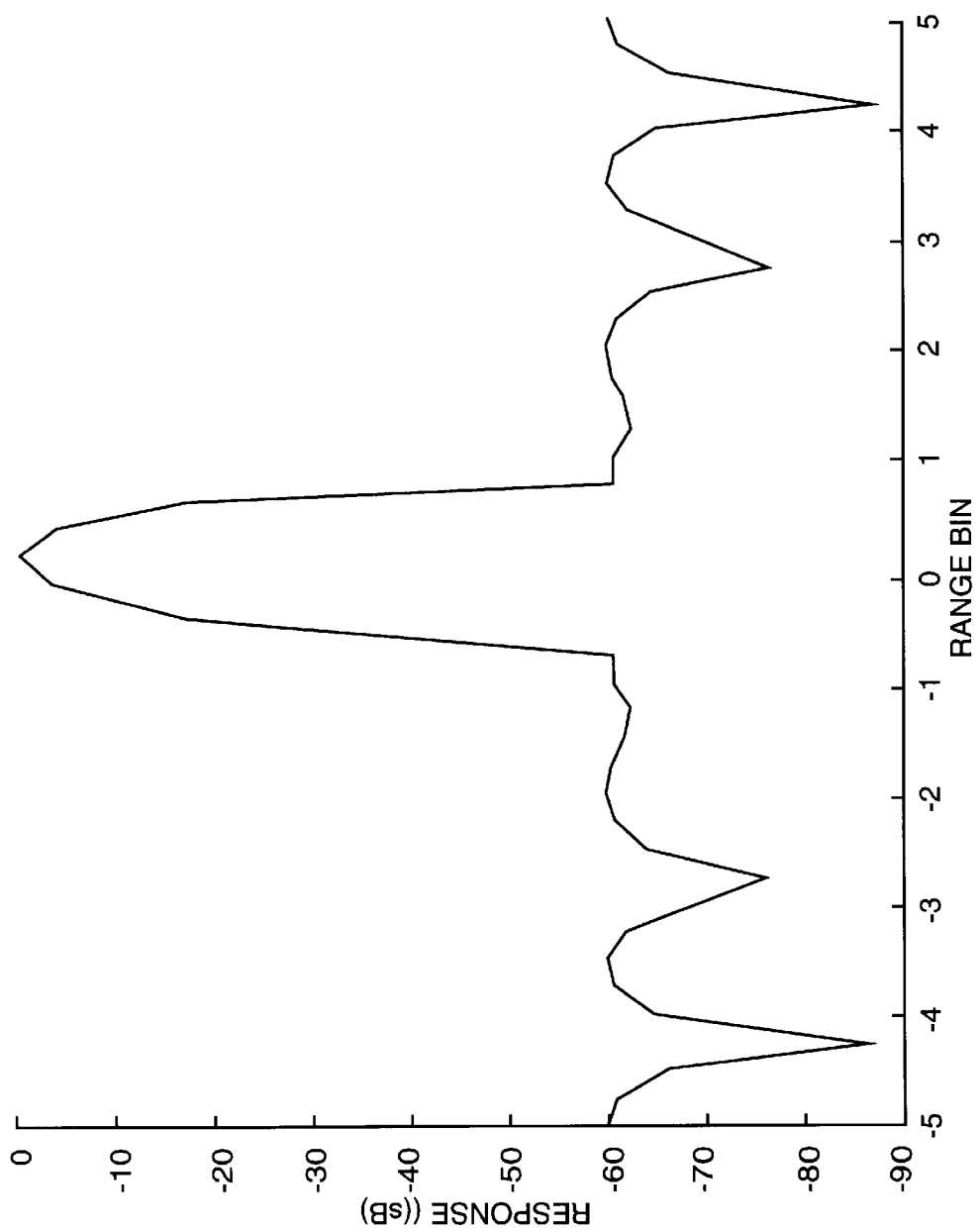
FIG. 4 is a graph that illustrates the response versus range bin that shows an expanded view around the mainlobe of FIG. 3.

The performance of large biphase codes was analyzed for up to $13^5$:1 (or 371293:1) pulse compression ratios. FIG. 3 shows the performance for a $13^4$:1 (or 28561:1) compound Barker code. FIG. 4 is an expanded view around the mainlobe shown in FIG. 3. In FIGS. 3 and 4, the code length is 28.56K, the loss is 1.198 dB, there were 2 samples per chip, the size of the FFT is 196.6K, the Doppler frequency times the pulse width=0, and the Dolph-Chebyshev weights were 158.8K 60 dB with 16 to 1, and the integrated range sidelobe ratio was −19 dB. The length of the time domain weighting window was constrained to be twice the pulse length. This was accomplished by transforming the complex weights described above to the time domain, zeroing out coefficients outside the designated window and transforming back to the frequency domain. As can be seen, the weighting loss is 1.2 dB, the peak sidelobe is about −29 dB and the ISLR is −19 dB.

The peak sidelobe and the ISLR were found to be insensitive to the code length when the length of the time domain weighting window is limited to twice the pulse width. The weighting loss was found to be 0.2 dB for a 13:1 Barker code and 1.7 dB for a 371293:1 compound Barker code. It was found that if the weighting window size is increased to three times the radar pulse length then the peak sidelobe decreases to −44 dB and the ISLR decreases to about −26 dB.

Figure 5:
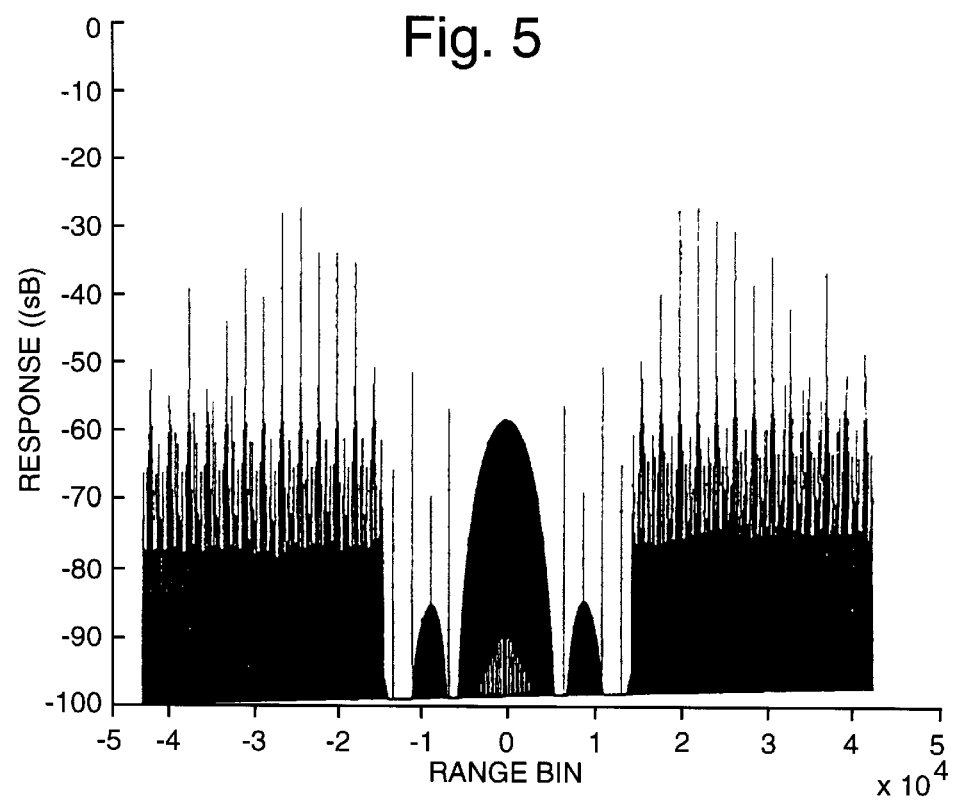
FIG. 5 illustrates performance of a synthetic array radar system with Doppler mismatch for a 28561:1 compound Barker code.

The performance with a Doppler mismatch corresponding to an azimuth shift of a pixel is shown in FIG. 5. In FIG. 5, the code length is 28.56K, the loss is 1.198 dB, there were 2 samples per chip, the size of the FFT is 196.6K, the Doppler frequency times the pulse width=0.005, and the Dolph-Chebyshev weights were 158.8K 60 dB with 16 to 1, and the integrated range sidelobe ratio was −18.97 dB. As can be seen from FIGS. 3 and 5, there is negligible degradation in the sidelobes and the ISLR due to this mismatch. Higher Doppler frequency offsets are rejected by pulse to pulse processing.

Thus, a processing method that provides for very large pulse compression ratio biphase codes that may be used in synthetic array radar systems has been disclosed. It is to be understood that the above-described embodiment is merely illustrative of one of the many specific embodiments that represent applications of the principles of the present invention. Clearly, numerous and other arrangements can be readily devised by those skilled in the art without departing from the scope of the invention.

What is claimed is:

1. A method for use in a synthetic array radar system comprising the steps of:

transmitting radar signals comprising a SAR waveform having a predetermined duty factor and resolution generated using a biphase code with a predetermined pulse compression ratio;

intrapulse Fourier transforming received radar returns comprising a SAR map;

multiplying the intrapulse Fourier transformed SAR map by a stored set of complex weights;

inverse Fourier transforming the weighted SAR map to obtain compressed range bins that correspond to a SAR map having enhanced sensitivity.

2. The method recited in claim 1 further comprising the step of processing received radar returns comprising the SAR map using motion compensation phase adjustment processing to provide a motion compensated SAR map.

3. The method recited in claim 2 further comprising the step of resampling the motion compensated SAR map.

4. The method recited in claim 1 wherein the stored weights comprise a weighted inverse of the spectrum of the biphase code.

5. The method recited in claim 1 wherein the weights comprise a modified set of Dolph-Chebyshev weights.

6. The method recited in claim 1 further comprising the step of low pass filtering the Fourier transformed and complex weighted SAR map to reduce the number of range bins.

7. The method recited in claim 1 further comprising the step of polar formatting the weighted transformed SAR map before the inverse Fourier transforming step.

8. The method recited in claim 1 wherein the complex weights are calculated by taking the reciprocal of the Fourier transform of the biphase code and multiplying by a modified set of Dolph-Chebyshev weights.

9. The method recited in claim 1 wherein the complex weights are optimized for range sidelobe performance, resolution and weighting loss.

10. The method recited in claim 1 wherein the complex weights that are optimized for range sidelobe performance, resolution and weighting loss.

11. A method for use in a synthetic array radar system comprising the steps of:

transmitting radar signals comprising a SAR waveform having a predetermined duty factor and resolution generated using a biphase code with a predetermined pulse compression ratio;

processing received radar returns comprising a SAR map using motion compensation phase adjustment processing to provide a motion compensated SAR map;

intrapulse Fourier transforming the motion compensated SAR map;

multiplying the intrapulse Fourier transformed SAR map by a stored set of complex weights;

inverse Fourier transforming the weighted SAR map to obtain compressed range bins that correspond to a SAR map having enhanced sensitivity; and processing the SAR map for display.

12. The method recited in claim 11 further comprising the step of resampling the motion compensated SAR map.

13. The method recited in claim 11 wherein the stored weights comprise a weighted inverse of the spectrum of the biphase code.

14. The method recited in claim 11 wherein the weights comprise a modified set of Dolph-Chebyshev weights.

15. The method recited in claim 11 further comprising the step of low pass filtering the Fourier transformed and complex weighted SAR map to reduce the number of range bins.

16. The method recited in claim 11 further comprising the step of polar formatting the weighted transformed SAR map before the inverse Fourier transforming step.

17. The method recited in claim 11 wherein the complex weights are calculated by taking the reciprocal of the Fourier transform of the biphase code and multiplying by a modified set of Dolph-Chebyshev weights.

* * * * *